June 8, 1954  W. G. PROCTOR  2,680,809
PHASE SHIFTER
Original Filed Feb. 27, 1945

INVENTOR.
WARREN G. PROCTOR
BY
Harry M. Saragovitz
Attorney

Patented June 8, 1954

2,680,809

UNITED STATES PATENT OFFICE 2,680,809

PHASE SHIFTER

Warren G. Proctor, Boston, Mass., assignor, by mesne assignments, to the United States of America as represented by the Secretary of War Original application February 27, 1945, Serial No. 580,020. Divided and this application November 17, 1950, Serial No. 204,355

1 Claim. (Cl. 250—27)

The present application is a division of my co-pending application for "Geometrical Computer" filed February 27, 1945, Serial No. 580,020, and issued on June 10, 1952, as Patent No. 2,600,264.

The present invention relates in general to electrical apparatus and more specifically to an electrical computing circuit for the solution of triangles especially with reference to a circuit for shifting the phase of an alternating current.

In many types of electrical apparatus used for range finding or gun directing, a method is desirable whereby triangles may be solved electrically. A special case of this problem is the solution of right triangles, and in particular the determination of the length of the hypotenuse of a right triangle, being given the lengths of the two sides.

A common method of electrically solving this problem is to provide two alternating current voltages, which are proportional respectively to the lengths of the two given sides of the triangle. One of these voltages is then shifted in phase by 90° and the two voltages are then applied to some type of summing device, the output of which is proportional to the peak amplitude of the vector sum of the two quadrature voltages, and hence proportional to the hypotenuse of the right triangle.

Former computers have employed two coils displaced 90° in space in some type of phase shifting device using rotating coils. One object of the present invention therefore is to produce this phase shift statically, thus conserving space and reducing the complexity of the phase shifting device.

One important problem in any type of phase shifting device is the elimination of frequency sensitivity. In other words, both the phase shift and the output amplitude of the device must be kept relatively independent of the frequency of the incoming alternating current wave. Since a complete 90° phase shift is extremely difficult to obtain, some method should also be provided to compensate for this incomplete phase shift since it introduces an error in the magnitude of the output of the summing device. Other objects of the present invention, therefore, are to provide means whereby both the phase shift and the gain of the phase shifting device will be kept constant, and means to compensate for the error introduced by incomplete phase shift.

In accordance with the present invention, there is provided a harmonic-free constant amplitude alternating current source, from which are taken two outputs proportional respectively to the lengths of the two known sides of the triangle. One of these voltages is fed to a phase shifter consisting of a differentiator and an integrator so connected that the combined gain of the two is relatively independent of variations in frequency of applied voltage and the output is shifted approximately 90° in phase with respect to the input. This output is fed through a push-pull arrangement to two detectors, while the other output from the alternating current source is fed to the same two detectors through a parallel arrangement. The output of these detectors is then combined in such a way that the resultant voltage is proportional to the arithmetic mean of the two detector input voltages. This latter arrangement compensates for incomplete phase shift, and the direct current voltage produced is then proportional to the length of the unknown side of the triangle being solved.

For a further understanding of this invention together with other objects and features thereof, reference is had to the following detailed description taken in connection wtih the accompanying drawings, in which.

Figure 1:
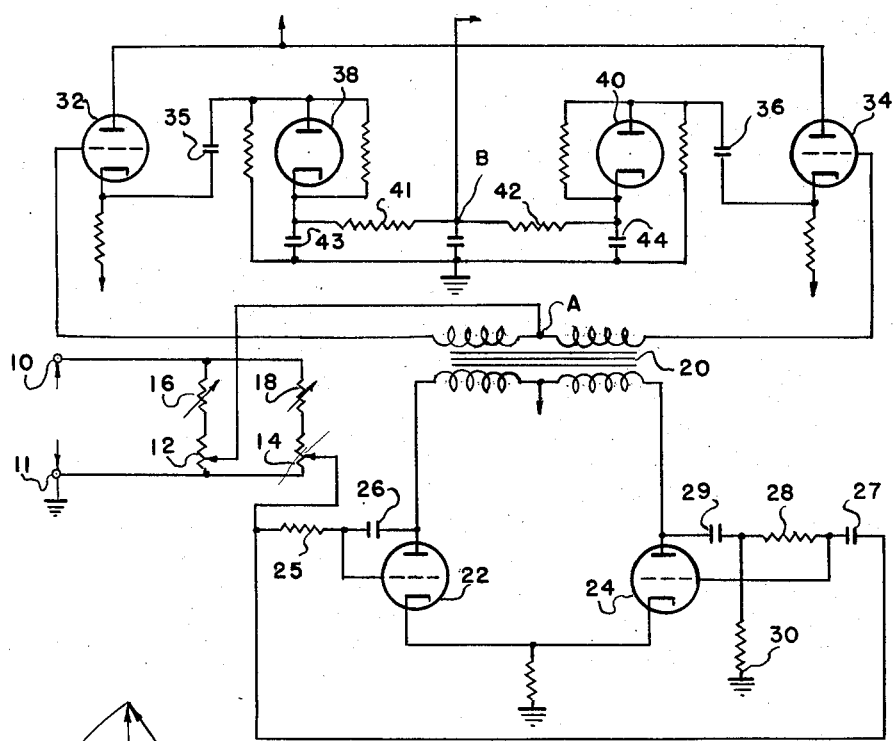
Fig. 1 is a schematic diagram of one form of the invention.

Referring now more particularly to Fig. 1 of the drawings, there is provided across terminals 10 and 11 a constant amplitude alternating current source, the output of which is free from harmonics of the fundamental frequency. This output is connected to two potentiometers, 12 and 14, each of which has in series with it a variable resistor, 16 and 18, respectively. The variable tap of potentiometer 12 is connected to the center tap A of the secondary of coupling transformer 20. The variable tap of potentiometer 14 is connected to the input circuits of the two phase shifting triodes, 22 and 24. The input circuit of triode 22 is an integrator composed of resistor 25 and capacitor 26, the latter being connected to the plate of triode 22 rather than to ground, thus introducing a certain amount of negative feedback into the stage.

The input circuit of triode 24 is a differentiator composed of capacitor 27 and resistor 28, the latter being coupled through capacitor 29 to the plate of triode 24, thus introducing negative feedback into this stage. Capacitor 29 is large enough to be a very low impedance to alternating current of the frequency used, and serves to block the D.-C. plate voltage of triode 24 from its grid.

The plates of triodes 22 and 24 are connected respectively to the two ends of the primary of coupling transformer 20, the center tap of the primary being connected to the plate supply voltage. Resistor 30 serves as a grid leak for triode 24, thus preventing the grid of this triode from being in a "floating" condition.

The two ends of the secondary of coupling transformer 20 are connected respectively to the grids of triodes 32 and 34, which are connected as cathode followers. The outputs of triodes 32 and 34 are connected through coupling capacitors 35 and 36 to the plates of diode detectors 38 and 40, respectively. Averaging resistors 41 and 42 are so connected that the direct voltage present at point B is the arithmetic mean of the output voltages of the two diodes, which in turn are proportional respectively to the total inputs to the two cathode follower triodes.

When the circuit of Fig. 1 is in operation, the variable tap of potentiometer 12 is adjusted so that the voltage applied to the center tap of the secondary of transformer 20 is proportional to the length of one known side of the triangle to be solved. Because of the center tap arrangement this voltage is fed equally and in the same phase to the grids of the two cathode follower triodes 32 and 34.

Similarly, the variable tap of potentiometer 14 is adjusted so that the voltage applied to the input circuits of the phase shifting triodes 22 and 24 is proportional to the length of the other known side of the triangle to be solved. Because of the constants of the integrator input circuit consisting of resistor 25 and capacitor 26, the current through this circuit is substantially in phase with the applied voltage; however, the voltage across capacitor 26 is applied to the grid of triode 22, and this voltage lags the current in the circuit by 90°, and hence lags the applied voltage by approximately the same amount.

Similarly, the constants of the differentiator input circuit, consisting of capacitor 27 and resistor 28, cause the current through it to lead the applied voltage by approximately 90°. The voltage across resistor 28 is applied to the grid of triode 24, and this voltage is in phase with the current, and hence leads the applied voltage by approximately 90°. Because of these phase shifts, the two triodes 22 and 24 are fed 180° out of phase with each other and hence operate push-pull, the two push-pull output voltages each being approximately 90° out of phase with the input voltage to the phase shift circuit, one leading and one lagging.

These push-pull voltages are fed through coupling transformer 20, so that they appear in push-pull on the grids of triodes 32 and 34. At the same time the voltage from the variable tap of potentiometer 12 is present on the grids of these triodes, and it is in quadrature with both of the push-pull voltages. The resultant voltage on each grid, therefore, is the vector sum of the two quadrature voltages, and hence proportional to the length of the hypotenuse of the triangle to be solved. Since triodes 32 and 34 are identical, their outputs, neglecting the effect of incomplete phase shift, will be equal. These outputs are fed to identical diode rectifiers 38 and 40, the outputs of which are respectively equal to the peak values of the inputs applied from triodes 32 and 34. The outputs of diodes 38 and 40 are combined through resistors 41 and 42 in such a manner that the voltage present at point B is equal to the arithmetic mean of the two diode outputs and again is proportional to the length of the hypotenuse of the triangle being solved.

By properly choosing the turns ratio of coupling transformer 20 and the gain of triodes 22 and 24, the constant of proportionality between the length of the one known side of the triangle and the magnitude of the push-pull voltage fed to the grids of triodes 32 and 34 can be made approximately equal to the constant of proportionality between the length of the other known side of the triangle and the magnitude of the voltage fed to the grids of the same two triodes through the center tap of the secondary of coupling transformer 20. Minor adjustments to make these constants more nearly equal can be made by varying the resistance of calibrating resistors 16 and 18.

It can be shown by circuit analysis that the gain of the integrator circuit including triode 22, resistor 25, and capacitor 26 is roughly inversely proportional to frequency, while the gain of the differentiator circuit including triode 24, capacitor 27, and resistor 28 is roughly directly proportional to frequency. As a result, the combined output of these triodes, which flows in the primary of transformer 20, is substantially independent of frequency variations of the input signal. It can further be shown that if we choose as a nominal frequency that frequency at which the theoretical gain of the integrator circuit and the differentiator circuit are equal, then variations of frequency of the order of ten per cent above and below this nominal frequency will cause variations in output of the order of only one-half per cent.

Figure 2:
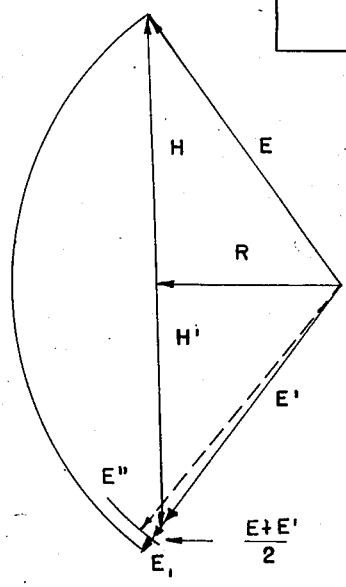
Fig. 2 is a vector diagram showing phase relationships of some of the voltages present in the apparatus.

Referring next to Fig. 2, we see a vector diagram of several of the voltages present in the circuit. Vector R represents the alternating voltage fed through the center tap of the secondary of transformer 20 to the grids of triodes 32 and 34. Vectors H and H' represent the push-pull voltages fed to the same grids. If the phase shift of the integrator and differentiator circuits were exactly 90°, H and H' would be perpendicular to R. However, the actual phase shift is always somewhat less than 90°, the actual amount varying with frequency. Therefore H and H' are shown not perpendicular to R, the amount of divergence from the perpendicular being exaggerated however for ease of illustration. Vectors E and E' are the resultant voltages present on the grids of triodes 32 and 34.

Since a cathode follower stage changes only the magnitude and not the phase of a voltage fed through it, these same vectors may represent the voltages fed to the two detector diodes 38 and 40. The output of these diodes depends not on the phase but only on the magnitude of the input to them, and therefore their D.-C. output magnitudes may be represented by the lengths of E' and E₁. The D.-C. output at point B as has been explained is the arithmetic mean of the detector outputs, and its magnitude is shown by $$\frac{E+E'}{2}$$

This can be seen to be approximately equal in magnitude to E'', which is what the D.-C. output at B would have been if the phase shift had been exactly 90°. The double detector therefore can be seen to compensate for errors introduced by incomplete phase shift.

While there has been described what is at present considered a preferred embodiment of the invention, it will be obvious to those skilled in the art that various changes and modifications may be made therein without departing from the invention, and that values of circuit constants given in the figures are illustrative only. It is aimed in the appended claim to cover all such changes as fall within the true scope of the invention.

What I claim to have invented is:

A static phase-shift circuit, comprising a source of electrical sine wave energy, a first triode amplifier, a first resistor, a first capacitor, said first resistor being connected between said source of energy and the control grid of said first triode amplifier, said first capacitor being connected between the control grid and the anode of said first triode amplifier, said first resistor and said first capacitor forming an integrating circuit, a second triode amplifier, a second capacitor connected between the control grid of said second triode amplifier and said source of energy, a third capacitor connected to the anode of said second triode amplifier, a second resistor connected between the control grid of said second triode amplifier and said third capacitor, said second resistor being thus connected to the anode of said second triode amplifier through said third capacitor, said second capacitor and said second resistor forming a differentiating circuit, load means interconnecting the anodes of said first and second triode amplifiers, and impedance means connected between the cathodes of said first and second triode amplifiers and ground.

References Cited in the file of this patent

UNITED STATES PATENTS

| Number | Name | Date |
|---|---|---|
| 2,099,536 | Scherbatskoy et al. | Nov. 16, 1937 |
| 2,174,166 | Plebanski | Sept. 26, 1939 |
| 2,256,538 | Alford | Sept. 23, 1941 |
| 2,279,506 | Reid | Apr. 4, 1942 |
| 2,282,105 | Tunick | May 5, 1942 |
| 2,318,934 | Evans | May 11, 1943 |
| 2,333,502 | Wickham | Nov. 2, 1943 |
| 2,454,426 | Beckwith | Nov. 23, 1948 |